US008615347B2

(12) United States Patent
Algüera Gallego et al.

(10) Patent No.: US 8,615,347 B2
(45) Date of Patent: Dec. 24, 2013

(54) THEFT SECURITY DEVICE FOR A VEHICLE COUPLING

(75) Inventors: José Manuel Algüera Gallego, Aschaffenburg (DE); Swen Saupe, Mainz (DE)

(73) Assignee: Jost-Werke GmbH, Neulsenburg (DE)

( * ) Notice: Subject to any disclaimer, the term of this patent is extended or adjusted under 35 U.S.C. 154(b) by 595 days.

(21) Appl. No.: 12/918,114

(22) PCT Filed: Feb. 25, 2009

(86) PCT No.: PCT/EP2009/052189
§ 371 (c)(1),
(2), (4) Date: Dec. 15, 2010

(87) PCT Pub. No.: WO2009/106529
PCT Pub. Date: Sep. 3, 2009

(65) Prior Publication Data
US 2011/0118942 A1 May 19, 2011

(30) Foreign Application Priority Data

Feb. 27, 2008 (DE) .......................... 10 2008 011 835

(51) Int. Cl.
*B62D 53/08* (2006.01)
(52) U.S. Cl.
USPC ......... 701/45; 701/36; 340/425.5; 340/426.1; 340/426.11; 340/426.12; 340/426.24; 280/472; 280/433; 280/446.1
(58) Field of Classification Search
None
See application file for complete search history.

(56) References Cited

U.S. PATENT DOCUMENTS

| 4,649,369 | A | * | 3/1987 | Walker et al. | 340/438 |
|---|---|---|---|---|---|
| 4,838,570 | A | * | 6/1989 | Toikka et al. | 280/507 |
| 5,069,472 | A | * | 12/1991 | Parr et al. | 280/433 |
| 5,319,698 | A | * | 6/1994 | Glidewell et al. | 379/39 |
| 5,477,207 | A | * | 12/1995 | Frame et al. | 340/431 |
| 5,516,138 | A | * | 5/1996 | Fontaine | 280/434 |
| 5,625,335 | A | * | 4/1997 | Kelly | 340/431 |
| 5,861,802 | A | * | 1/1999 | Hungerink et al. | 340/431 |
| 6,250,650 | B1 | * | 6/2001 | Douglas | 280/6.155 |
| 6,285,278 | B1 | * | 9/2001 | Schutt et al. | 340/431 |
| 6,313,791 | B1 | * | 11/2001 | Klanke | 342/357.75 |
| 6,367,888 | B1 | * | 4/2002 | Kee et al. | 303/89 |
| 6,394,480 | B1 | * | 5/2002 | Brennan | 280/432 |
| 6,402,261 | B1 | * | 6/2002 | Barnett | 303/89 |
| 6,923,509 | B1 | * | 8/2005 | Barnett | 303/89 |
| 7,053,823 | B2 | * | 5/2006 | Cervinka et al. | 342/357.31 |

(Continued)

FOREIGN PATENT DOCUMENTS

DE  10 2004 029 821 A1  1/2006

OTHER PUBLICATIONS

International Search Report, PCT/EP2009/052189, mailed Nov. 11, 2010, 5 pgs.

*Primary Examiner* — Jonathan M Dager
(74) *Attorney, Agent, or Firm* — Brinks, Gilson & Lione

(57) ABSTRACT

An anti-theft security device for a vehicle coupling, in particular a fifth wheel coupling (1), includes a security apparatus (2) and a control apparatus (3) which are electrically connected to each other. The control device (3) is connected to at least one vehicle-side system (10*a, b, c*) having an emergency function. Upon the triggering of at least one emergency function of the vehicle-side system, the control apparatus (3) deactivates the control apparatus (2) directly or indirectly.

10 Claims, 1 Drawing Sheet

(56) References Cited

U.S. PATENT DOCUMENTS

| | | | |
|---|---|---|---|
| 7,119,696 B2 | 10/2006 | Borugian | 340/439 |
| 7,543,837 B2* | 6/2009 | Crawley | 280/434 |
| 7,548,155 B2* | 6/2009 | Schutt et al. | 340/431 |
| 7,931,291 B2* | 4/2011 | Mann | 280/434 |
| 8,444,168 B2* | 5/2013 | Jacinto | 280/507 |
| 2001/0050509 A1* | 12/2001 | Holt | 303/89 |
| 2003/0095046 A1* | 5/2003 | Borugian | 340/576 |
| 2003/0097218 A1* | 5/2003 | Borugian | 701/213 |
| 2004/0145150 A1* | 7/2004 | Yeakel | 280/433 |
| 2006/0017551 A1* | 1/2006 | Neher et al. | 340/426.19 |
| 2006/0290099 A1* | 12/2006 | Buttner | 280/433 |
| 2011/0221165 A1* | 9/2011 | Alguera et al. | 280/477 |
| 2012/0053797 A1* | 3/2012 | Alguera Gallego | 701/49 |

* cited by examiner

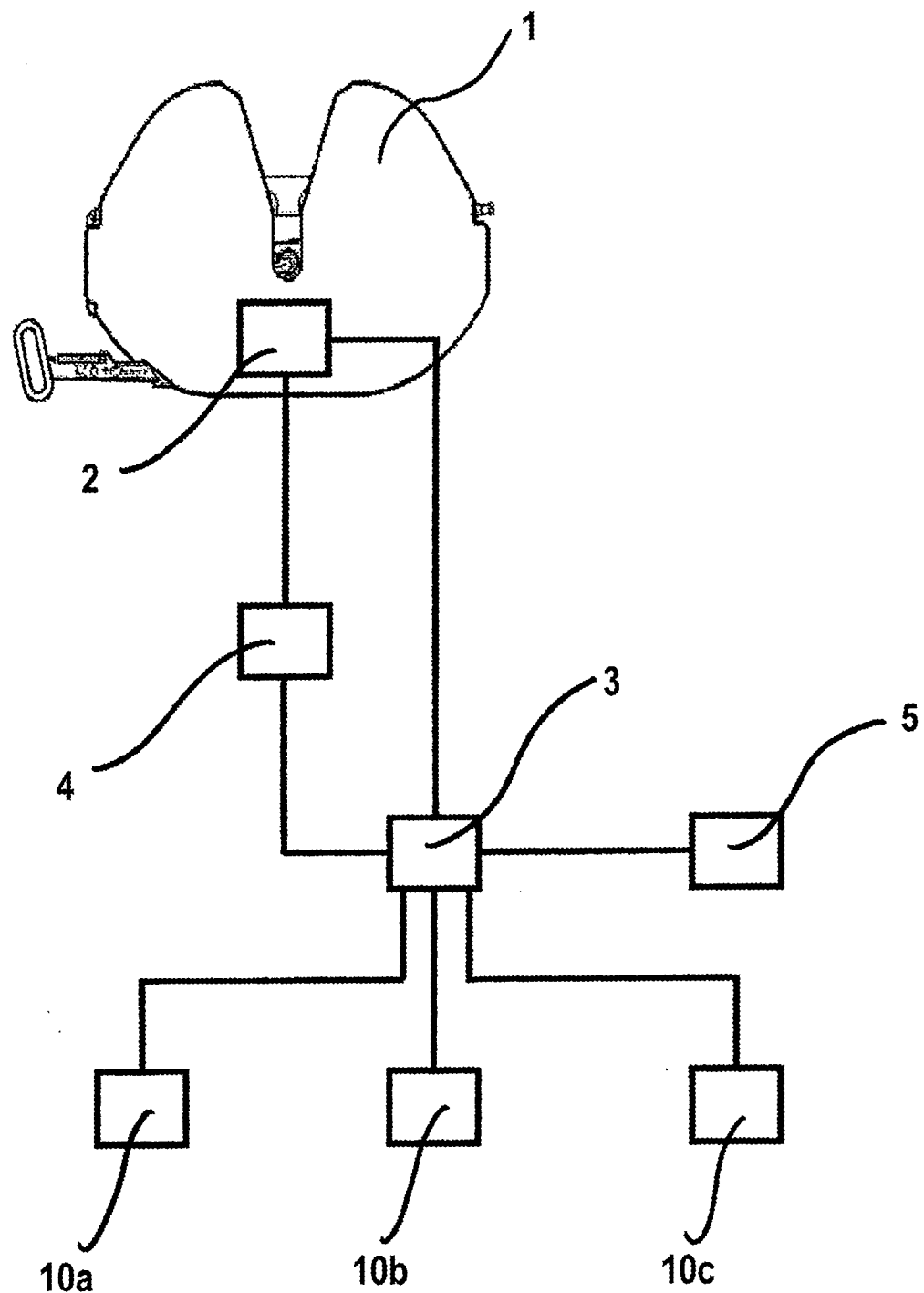

THEFT SECURITY DEVICE FOR A VEHICLE COUPLING

CROSS-REFERENCE TO RELATED APPLICATIONS

The present application is the National Phase of PCT/EP2009/052189, filed on Feb. 25, 2009, and claims the priority of German Patent Application 10 2008 011 835.4, filed on Feb. 27, 2008.

TECHNICAL FIELD OF THE INVENTION

The invention relates to an anti-theft security device for a vehicle coupling arranged on a vehicle, in particular a fifth wheel coupling.

BACKGROUND OF THE INVENTION

Commercial vehicles consist usually of a towing vehicle and one or more towed trailers. Such an articulated road train is called a motor vehicle with trailer; a semi-truck is referred to as a tractor engine and a semitrailer.

Parked and non-driven vehicles each can be secured against theft by mechanical devices. The motorized parts of the truck are in most cases also secured against theft, for example, by means of immobilizers or alarm devices. If both vehicle parts are coupled to each other, there is a certain theft protection through these systems for the entire semi-truck because decoupling is only possible by a movement of both vehicle parts relative to one another.

However, the number of thefts where the driven vehicle is separated from the trailer or semitrailer and subsequently stolen is constantly increasing despite the current technical aids. Thus, it is desired to provide devices and systems which prevent that the semitrailer can be decoupled without authorization or, at least, that this process is made difficult enough that the attempt to do so appears to be hopeless in the first place.

From WO 03/043838 A2 an anti-theft security device for fifth wheels is known which comprises an actuating device with a locking pin. The fifth wheel has a lock with a pawl which can be manually actuated via a linkage with a drawbar.

The anti-theft security device provides that the lock pin is inserted either in the movement path of the pawl or of the components of the linkage for actuating the pawl so that the pawl can not be moved from its closed position into an open position.

The anti-theft security device has a receiver through which the actuating device can be controlled. The anti-theft security device is coupled to a Global Positioning Device of the vehicle. If the vehicle is not driving on the intended route, this is recognized by the GP-System and a signal for arming the anti-theft security system is transmitted to the receiver whereupon the locking pin is brought into the locking position.

According to another embodiment, the anti-theft security device can also be controlled via internet by means of an externally arranged computer via the on-board computer of the towing vehicle.

Attempts to tamper at the fifth wheel are also recognized by the anti-theft security system which subsequently goes automatically into the armed position and thus into the locking position.

In WO 03/044627 of the same applicant, further security systems are described, wherein, among other things, the driver's authorization is checked through the input of a code. In case of non-compliance or deviation from the travel route, an automatic intervention in the vehicle functions takes place.

WO 2005/028290 A1 discloses a fifth wheel with an anti-theft security device in which a locking pin engages directly with the locking hook and locks the same. The locking of the door can be released via the drawbar. A forcible separation of tractor and semitrailer can not be prevented because in case of a jerky start of the semi-truck, the anti-theft security device can get damaged or even destroyed thereby turning the locking hook in the open position.

The anti-theft security device comprises a control device in the driver's cab of the tractor, in which control device a numerical code can be entered for activation. Further, sensors and displays are connected with the control device for monitoring the fifth wheel.

DE 195 16 101 A1 describes an anti-theft security device for a coupled semitrailer. To protect the semitrailer coupled to a tractor against theft by decoupling, the fifth wheel has a lock which controls an axially movable tappet. The tappet engages directly with the locking element of the locking hook when the same is in the locking position. The arrangement of the anti-theft security device is selected in such a manner that the tappet is pressurized when needed. The locking of the manually actuated locking hook has the advantage that in case of shocks or overloading the manual actuator, the elements of the manual actuators with weaker cross-sections break and the locking of the locking hook remains intact in any case. All parts of the anti-theft security device are subjected to compressive stress upon an attempt to unlock by force so that relatively small cross-sections provide the required functional safety.

From DE 295 01 043.6, an anti-theft security system for, among other things, semitrailers is known, which system is configured as electronic immobilizer. It is provided that upon activation of the anti-theft security device, i.e. in case of theft, the anti-theft security device influences the function of the tractor in such a manner that the same is blocked.

The known anti-theft security devices are either systematically activated, e.g. by the driver, and can only be deactivated by systematically entering, e.g., a numerical code.

However, there are emergencies in which the semi-truck has to be separated by emergency responders at the place of accident. In such cases, the driver might be unable to deactivate the anti-theft security device, or, the respective equipment for deactivating the anti-theft security device by the driver is not functioning anymore.

Separating the two vehicles is then possible only with major efforts and with adequate tools. This involves not only a considerable expenditure of time but it can also result in additional danger for the emergency responders and/or the road users, in particular if the semi-truck transports dangerous goods.

SUMMARY OF THE INVENTION

It is thus the object of the invention to provide an anti-theft security device which is automatically deactivated or can be deactivated in a simple manner in case of an emergency situation so that a separation of tractor and trailer is possible without any problems.

This object is solved with an anti-theft security device which is characterized in that the control apparatus is connected to at least one vehicle-side system comprising an emergency function and that, upon triggering of at least one emergency function of the vehicle-side system, the control apparatus deactivates the security apparatus directly or indirectly.

The security device can comprise any actuating device with security elements such as, e.g., electrical, pneumatic, or hydraulic actuators with locking pins or locking pawls. The security device engages preferably with the locking device of the vehicle coupling. For fifth wheels couplings, this can be the locking hook or the locking pawl or the device for actuating the locking pawl.

Direct deactivation of the security apparatus is to be understood as the immediate unlocking of the anti-theft device, in particular without additional human involvement.

The indirect deactivation of the security apparatus is also possible if an additional security function is to be provided, e.g., to prevent, in an emergency situation, a separation of the trailer from the tractor by arbitrary persons. The indirect deactivation of the security apparatus depends on the respective vehicle-side system and, if applicable, on accessory device of the anti-thief security device, wherein upon occurrence of the emergency situation additional measures must still be taken, e.g. by the emergency responder, to deactivate the security apparatus. These additional measures are described in connection with the individual vehicle-side systems to which the anti-theft device is connected.

The indirect deactivation can also be provided in the anti-theft security device as an option in addition to the direct deactivation. The vehicle-side systems, if they are connected to the control apparatus, are integral part of the anti-theft security device.

Preferably, the control apparatus is connected to at least two vehicle-side systems, wherein the control apparatus deactivates the security apparatus upon triggering of at least two emergency functions of the vehicle-side systems. In this embodiment, the deactivation is carried out only if two or more emergency functions occur. A logical conjunction is preferably established within a certain time window. If the emergency functions occur within said time window, the deactivation takes place.

Preferably, the control apparatus is configured for processing signals of the vehicle-side system and for switching on the security apparatus when specified system values are reached. In case of the connection with acceleration sensors, the system values are acceleration values which occur, e.g., during an accident.

Vehicle-side systems are such systems which are available in the vehicle anyway.

Thus, the vehicle-side system comprises preferably at least an airbag, a restraint system, a crash sensor, an acceleration sensor, the anti-lock braking system, or the central locking system. In particular, the security apparatus is deactivated if at least one airbag is triggered, one restraint system, e.g. seat belt tensioner, is activated, or one crash sensor or one acceleration sensor responds.

The emergency functions can also be linked together, e.g. the release of an airbag and the actuation of the anti-lock braking system, so that the deactivation is carried out only if both functions occur.

In case of a central locking system, disabling the central locking function is usually provided as emergency function so that injured persons can be rescued from the vehicle without the need to break the doors open. This function is also used to deactivate the anti-theft security device in emergency situations and thus to allow a separation of trailer and tractor without any problems.

When linking the control apparatus with the central locking system of the vehicle, besides the direct deactivation of the security apparatus, an indirect deactivation is also possible. For example, it can be provided that a deactivation takes place only if a defined sequence of actuations of the central locking device is carried out which can be carried out only by emergency responders or rescue workers. Specific sequences of actuations can be, e.g., opening and closing the central locking system three times, opening three times and closing two times, and subsequently opening the central locking system once.

Such sequences of actuation represent a code which can be carried out only by authorized persons, e.g. of emergency responders who either know this sequence and thus know the code, or request said code from the respective trucking company. This prevents that in an accident situation a pilferage can take place, i.e., a theft of the semitrailer or the trailer can be avoided.

According to a further embodiment, the control apparatus can be connected to the energy system of the vehicle. The control apparatus is configured to recognize the energy failure and, in the event of an energy system failure, deactivates the security apparatus, preferably in connection with a further emergency function.

In order that the deactivation can take place, the anti-theft security device comprises its own separate energy supply apparatus, in particular power supply apparatus. Said separate energy supply apparatus can also be configured as emergency power supply which can only be activated when the vehicle-side energy system fails.

The control apparatus is preferably connected to a code input device which is to be unlocked for entering the code. In an emergency situation, the control apparatus is configured for unlocking the code input device in such a manner that the required code for deactivating the anti-theft system can be entered by authorized persons. In this embodiment, also the security apparatus is indirectly deactivated.

In the case that the code input device fails as a result of an accident, the control apparatus is configured for recognizing this emergency function and deactivates the anti-theft security device directly without the need of human intervention.

The code input device as integral part of the anti-theft security device can be arranged in the vehicle, wherein the code input can be carried out at the device or through a wireless connection by means of an external device, e.g. through the internet and the on-board computer.

BRIEF DESCRIPTION OF THE DRAWINGS

FIG. 1 shows a schematic illustration of a preferred embodiment of an anti-theft security device.

DETAILED DESCRIPTION OF THE DRAWINGS

A security apparatus 2 is arranged on a schematically illustrated fifth wheel coupling 1. Preferably, said security apparatus 2 is arranged below the fifth wheel coupling plate in the region of the locking device (not shown) of the fifth wheel coupling 1 which is locked after engaging the king pin (not shown) arranged on the semitrailer. The security apparatus 2 has the task to additionally block the fifth wheel if this is desired, and to release it if the situation requires it. The security apparatus 2 comprises, for example, an actuator and a locking pin which engages with a component of the locking apparatus of the fifth wheel and causes a blocking of the respective component.

Connected to the security apparatus 2 is a control apparatus 3 which controls the security apparatus 2.

As an example, the control apparatus 3 is connected to three vehicle-side systems 10a, b, c which are representative for one or more airbags, the central locking system and, if applicable, the energy system of the vehicle. In addition, the device can comprise its own separate power supply 4 through which the security apparatus 2 and the control apparatus 3 are supplied with power if, for example, the energy supply 10c of the vehicle breaks down.

The control apparatus 3 is configured for recognizing the failure of the energy system, wherein, at the same time, the separate energy supply 4 is activated.

Moreover, the control apparatus 3 is configured for processing signals of the other vehicle-side systems 10a, b, and is thus capable, upon triggering of the emergency functions of at least one of the vehicle-side systems 10a-10c, to control the security apparatus 2 in such a manner that the same releases the blockage of the locking system.

In addition, a code input device 5 is drawn through which the control apparatus 3 is normally controlled when the appropriate authorized person enters the appropriate numeric code.

The code input device 5 can be locked to protect it against unauthorized use, in particular if the vehicle is on the way to the point of destination. This prevents that in the event of an attack on the vehicle the driver can be forced to enter the appropriate code number to be able to decouple the semi-trailer in this manner.

To be able to enter the code number in an emergency situation, the control apparatus 3 is configured for unlocking the code input device 5 upon recognition of the emergency situation of the vehicle-side system 10a-10c.

REFERENCE NUMBER LIST

1 Fifth wheel coupling
2 Security apparatus
3 Control apparatus
4 Power supply apparatus
5 Code input device
10a, b, c Vehicle-side system

The invention claimed is:

1. An anti-theft security device for a vehicle fifth coupling arranged on a vehicle, the anti-theft device comprising a security apparatus (2) which engages with a component of the vehicle fifth coupling and blocks the component in an activated state and releases the component in a deactivated state, and with a control apparatus (3) which is electrically connected to the security apparatus (2) and reversibly switches the security apparatus between the activated state and the deactivated state, wherein the control apparatus (3) is connected to at least one vehicle-side system (10a, b, c) which comprises an emergency function that is triggered upon receipt of a sensor signal indicating an emergency event, the emergency event comprising a situation in which the trailer is separated from the tractor by emergency responders at the place of accident, and wherein, upon triggering of the emergency function of the at least one_vehicle-side system (10a, 10b, 10c), the control apparatus (3) deactivates the security apparatus (2) directly or indirectly, wherein a direct deactivation causes an immediate unlocking of the anti-theft security device, and an indirect deactivation enables a performance of additional measures that cause unlocking of the anti-theft security device.

2. An anti-theft security device for a vehicle fifth coupling arranged on a vehicle, the anti-theft device comprising a security apparatus (2) which engages with a component of the vehicle fifth coupling and blocks the component in an activated state and releases the component in a deactivated state, and with a control apparatus (3) which is electrically connected to the security apparatus (2) and reversibly switches the security apparatus between the activated state and the deactivated state, wherein the control apparatus (3) is connected to at least two vehicle-side systems (10a, b, c) which comprise vehicle-side emergency functions triggered upon receipt of sensor signals indicating an emergency event, the emergency event comprising a situation in which the trailer is separated from the tractor by emergency responders at the place of accident, and wherein, upon triggering of at least two vehicle-side of the vehicle-side emergency functions, the control apparatus deactivates the security apparatus (2).

3. The device according to claim 1, wherein the vehicle-side system (10a, b, c) comprises at least one airbag, one restraint system, one crash sensor, one acceleration sensor, an anti-lock braking system (ABS) or a central locking system of the vehicle.

4. The device according to claim 1, wherein the control apparatus (3) is configured for processing signals of the at least one vehicle-side system (10a, b, c) and for switching on the security apparatus (2) when specified system values of the at least one vehicle-side system (10a, b, c) are reached.

5. The device according to claim 1, wherein one of the at least one vehicle-side system (10a, b, c) is an energy system of the vehicle and wherein the control apparatus (3) deactivates the security apparatus (2) upon failure of the energy system.

6. The device according to claim 1, wherein the anti-theft security device comprises a separate energy supply apparatus (4).

7. The device according to claim 6, wherein the separate energy supply apparatus (4) is an emergency power supply configured to be activated upon failure of the vehicle-side energy system.

8. The device according to claim 1, wherein the control apparatus (3) is connected to a code input device (5) which is configured to be unlocked for entering the code upon triggering the emergency function.

9. The device according to claim 8, wherein the control apparatus (3) unlocks the code input device (5) for entering the code, and deactivates the security apparatus (2) depending on the code input or the system state of the code input device.

10. The device according to claim 8, wherein the code input device (5) is arranged in the vehicle and the code input is carried out at the device (5) or through a wireless connection via an external device.

* * * * *

UNITED STATES PATENT AND TRADEMARK OFFICE
CERTIFICATE OF CORRECTION

PATENT NO.        : 8,615,347 B2
APPLICATION NO. : 12/918114
DATED             : December 24, 2013
INVENTOR(S)       : Algüera Gallego et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 706 days.

Signed and Sealed this
Twenty-second Day of September, 2015

Michelle K. Lee
*Director of the United States Patent and Trademark Office*